Jan. 5, 1932.　　　G. M. DEMING　　　1,839,837

PRESSURE REGULATOR

Filed Dec. 28, 1927　　4 Sheets-Sheet 1

INVENTOR
George M. Deming
BY
ATTORNEY

Jan. 5, 1932.  G. M. DEMING  1,839,837
PRESSURE REGULATOR
Filed Dec. 28, 1927    4 Sheets-Sheet 2
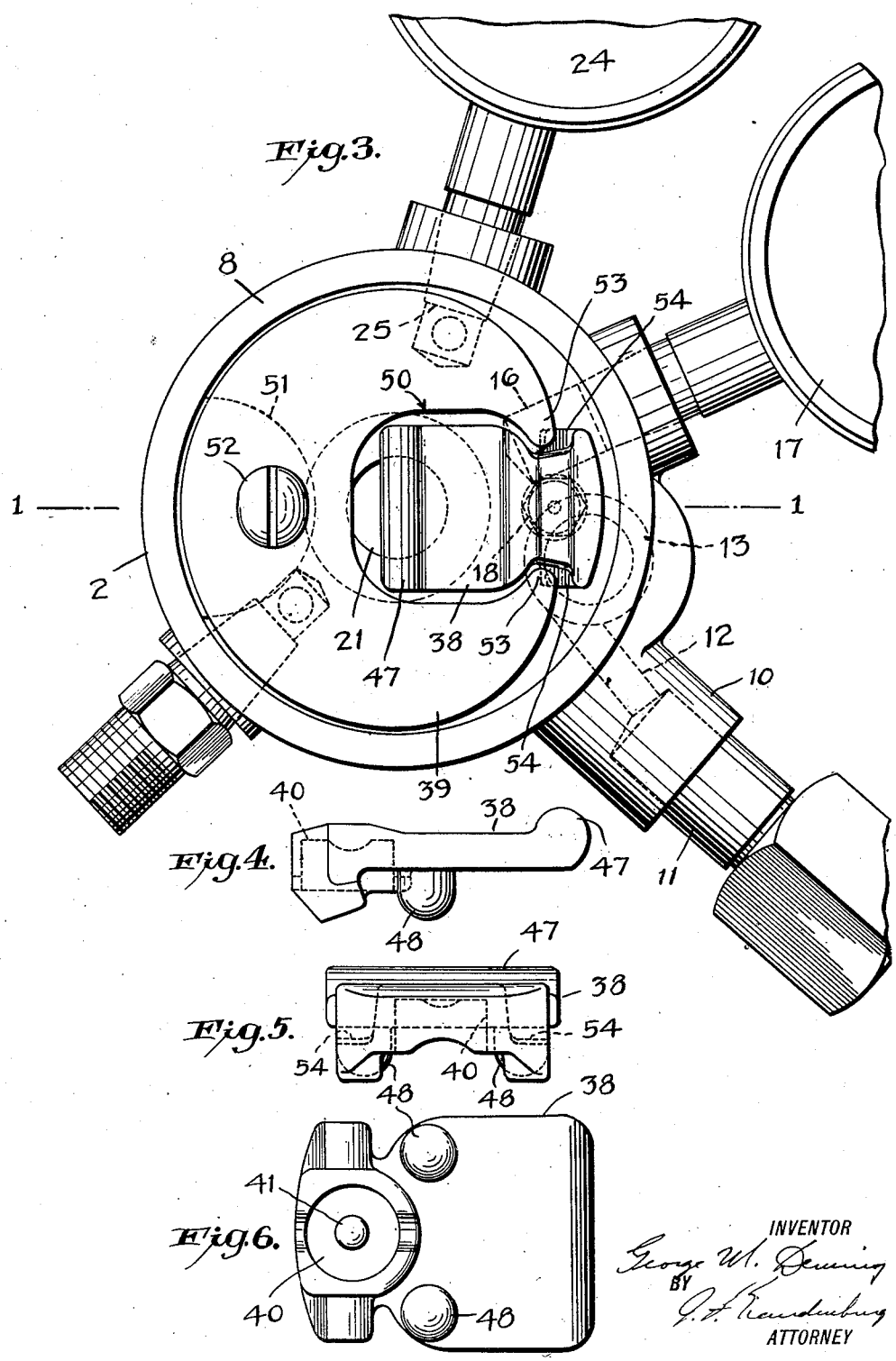

Jan. 5, 1932.  G. M. DEMING  1,839,837
PRESSURE REGULATOR
Filed Dec. 28, 1927   4 Sheets-Sheet 3

George M. Deming INVENTOR
BY
ATTORNEY

Jan. 5, 1932.   G. M. DEMING   1,839,837
PRESSURE REGULATOR
Filed Dec. 28, 1927    4 Sheets-Sheet 4

INVENTOR
George M. Deming
BY
ATTORNEY

Patented Jan. 5, 1932

1,839,837

UNITED STATES PATENT OFFICE

GEORGE M. DEMING, OF JERSEY CITY, NEW JERSEY, ASSIGNOR TO AIR REDUCTION COMPANY, INCORPORATED, OF NEW YORK, N. Y., A CORPORATION OF NEW YORK

PRESSURE REGULATOR

Application filed December 28, 1927. Serial No. 243,062.

The invention relates to pressure regulators or reducing valves, and more particularly to gas pressure regulators.

An object of the invention is to provide an improved pressure regulator of the lever type. Advantages sought in this connection are simplicity and economy of construction, compactness, convenience of access to the internal parts and of assembling, elimination of leakage, and improved functioning of the regulator in use.

Regulators of the lever type have tended to be of awkward and comparatively expensive design, requiring either special body shapes, or annex castings which have to be secured to the main castings. In the latter case special care must be taken to produce a tight joint, which frequently does not remain tight. The usual lever pivots require drillings through the body, which have to be closed; and the known constructions may also require special openings to get at the seat or valve member, calling for additional expense in manufacture and giving rise to further possibility of leakage. In order to obtain reasonable efficiency in the operation of these regulators it has been common to provide separate equalizing means interposed between the lever, or one of a set of levers, and the seat, this involving extra parts and increasing the size of the regulators. In many regulators the levers, or one of the levers, has been fastened to the diaphragm, weakening the latter and creating another point where leakage may occur, increasing the cost of manufacture, and making it more difficult to take the regulator apart and put it together.

In the present invention one of the things sought has been a compact and simple body shape, consisting essentially of a single casting, which does not require many expensive machining operations, and the compactness of which is desirable in itself. At the same time, it has been sought to avoid all unnecessary drillings, joints, openings and closures.

The body of my improved lever type regulator is preferably a comparatively small circular casting containing the low pressure cavity entirely within its contour. A single short lever is housed within this cavity, one end of this lever bearing, unfastened, against the diaphragm and the other end carrying the seat and equalizing means to coact with a high pressure nozzle, which projects into said cavity and is contained within the main contour of the body. A spring in the low pressure cavity acts on this lever, and I have contrived that the lever shall be held in place by this spring alone. The spring may be termed a compensating spring. The only joint required is the diaphragm joint between the body and the spring case, a rubber diaphragm affording a very effective gasket. With such a construction everything is rendered accessible simply by removing the spring case, and the regulator is as easily assembled.

A special type and disposition of compensating spring and relation thereof to the lever is employed. the features being such as to contribute to the accomplishment of the objects which have been indicated, and also to secure better and more reliable operation of the regulator.

The single lever, which carries the seat and bears against the diaphragm and which receives the pressure of the compensating spring, is fulcrumed by means of broad rounded protuberances on the under side of the lever working in recesses in the body. The construction is one that is easy to produce, and it affords a freely separable fulcrum which enables the lever to be simply picked out when the diaphragm case and diaphragm are removed and the spring is disengaged. It also provides in a very simple way for definite and very constant alining of the seat, and the friction between the protuberances and recesses is just sufficient for a dampening effect which prevents the type of vibration known as "singing", without, however, introducing such frictional resistance as to render the regulator not properly responsive to variations of outflow requirements.

The seat is accommodated within a recess in the lever, the construction of which is such as to provide for equalizing movement of the seat relative to the lever for accurate engagement with the lip of the nozzle. In this connection, yielding means are interposed between the sides of the seat and the lever.

The use of a short lever for the purpose of the compact and simple design of the regulator would tend to require close manufacturing tolerances, if the seat is to be carried directly by the lever and not acted upon through the agency of an intermediate equalizing agency. The embodiment of effective equalizing means in the single lever is, therefore, an important factor.

Another feature of the invention relates to the provision of a special means and relation for killing creep, in event of the seat failing to coact properly with the nozzle, due to the presence of a foreign particle or for any other reason. The lever or operating connection not being fastened to the diaphragm, the increasing pressure in the low pressure cavity resulting from leakage or excessive flow between the seat and nozzle can not act directly to force the seat powerfully against the nozzle. In my copending application Serial No. 172,616, filed March 4, 1927, which became Patent No. 1,745,785, Feb. 4, 1930, I have disclosed a plan wherein the compensating spring is given a large excess of stress over that required to balance the pressure of the gas within the nozzle, and the adjusting spring is given a considerable margin of residual stress, which is not relieved even though the adjusting screw be released as far as it will go, the excess stress in the adjusting spring being calculated to balance off the excess stress in the compensating spring under ordinary conditions. Consequently, when the pressure in the low pressure chamber rises sufficiently it acts upon the adjusting spring through the diaphragm to relieve the compensating spring of the imposed restraining pressure, and the compensating spring then becomes capable of forcing the seat against the nozzle with extraordinary force.

In the present regulator, I have provided a special spring, which is always under stress and which is unaffected by the adjustment of the adjusting spring, this special spring acting through the diaphragm and lever, or other connection, to overcome excess stress in the compensating spring, but to permit that excess stress to be exerted in event of creeping.

Another feature of the invention has to do with a special manner of providing a dead-end pocket or chamber in such relation as to prevent ignition of the seat material in event of the full cylinder pressure being turned on suddenly and causing high compression of the gas in the regulator, with consequent development of momentary high temperature. The general nature of this safety provision is explained in my copending application aforesaid.

Other objects and features of the invention will become apparent to those skilled in the art.

In the accompanying drawings forming part hereof:

Fig. 3 is a plan view of the regulator with the spring case and diaphragm removed, attachments outside of the body being partly broken away;

Figs. 4, 5 and 6 are, respectively, a side elevation, an end elevation and a bottom plan of the lever;

Figure 1:
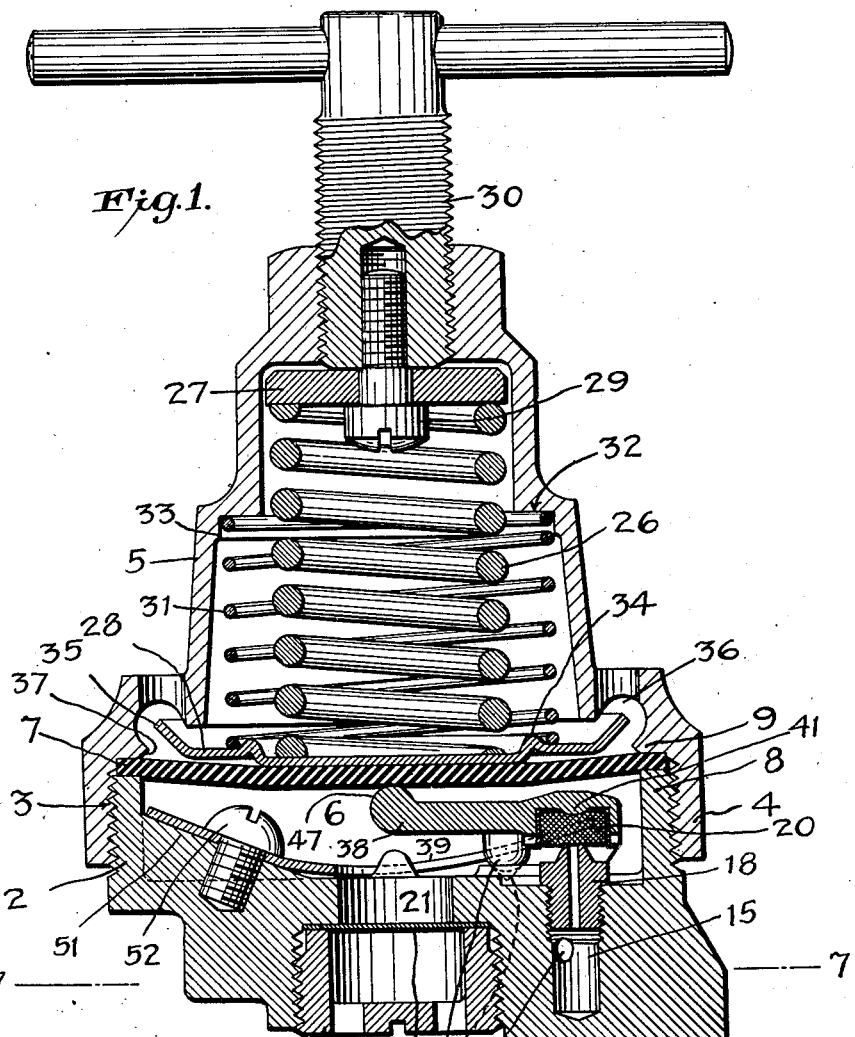
Fig. 1 is a central longitudinal section through a regulator embodying the invention, the section being taken on the line 1—1 of Fig. 3.
Figure 2:
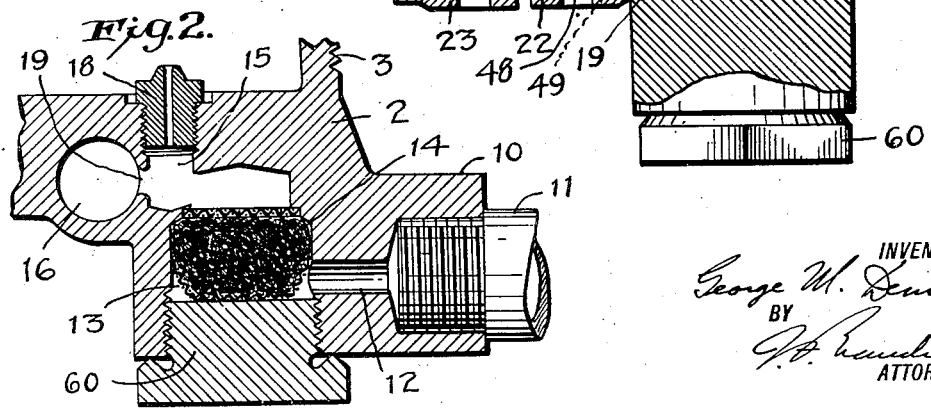
Fig. 2 is a section on the line 2—2 of Fig. 7.
Figure 7:
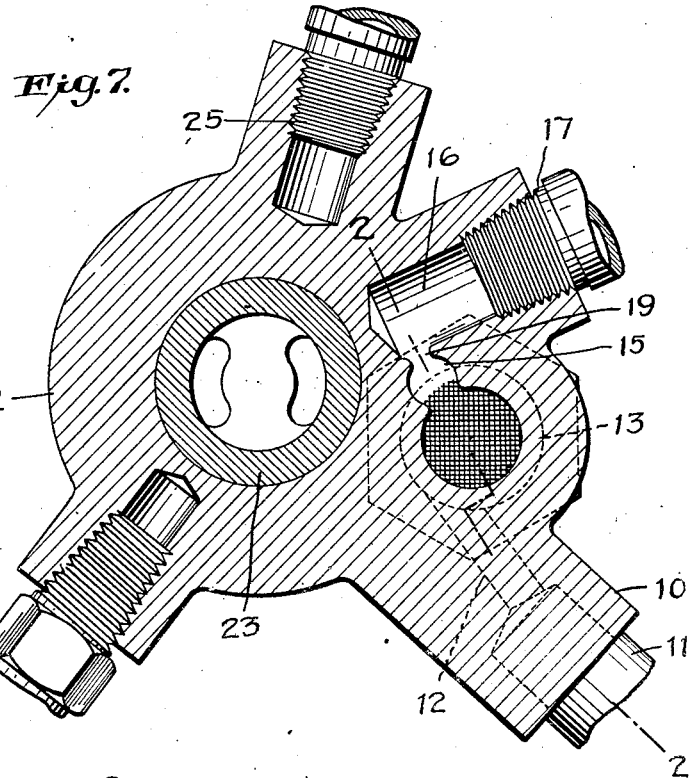
Fig. 7 is a cross-section on the line 7—7 of Fig. 1.
Figure 8:
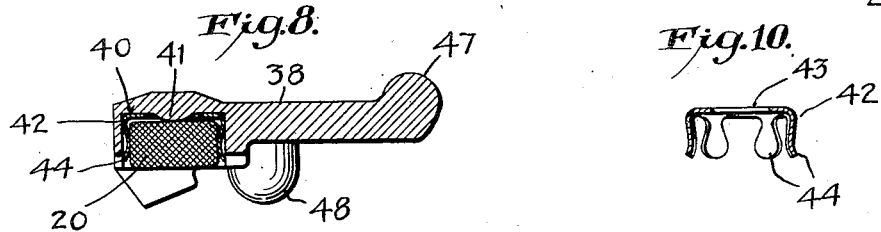
Figs. 8 and 9 are longitudinal sections through the lever showing the seat and two forms of yielding conformer therein.
Figure 10:
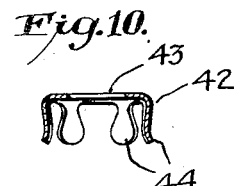
Figs. 10 and 11 are sections of the two forms of conformer illustrated in Figs. 8 and 9.
Figure 9:
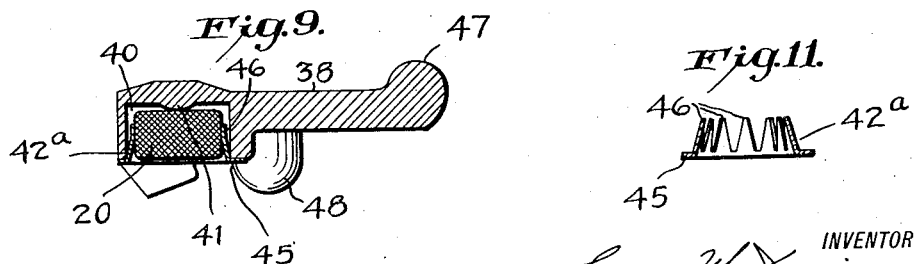
Figure 11:
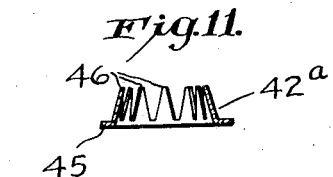

The regulator shown in Figs. 1—11 will first be described.

The circular body 2 has external screw threads 3 for engagement by the internally threaded bottom rim 4 of a spring case 5. The upper part of the body is hollowed out to form a circular low-pressure cavity 6, and a rubber diaphragm 7 is clamped around its edge between the top of the rim or bounding wall 8 of the body and a shoulder 9 on the spring case. The diaphragm closes and forms the top of the chamber 6.

The lower part of the body has a lateral projection 10 for the reception of the high-pressure connection 11. The high pressure gas from this connection is admitted through a drilled opening 12 into the lower portion of a filter chamber 13 containing a filter 14, the passage 12 preferably opening tangentially into said chamber. A socket 15 drilled downward from the top breaks on the one hand into the filter chamber 13 above the filter, and on the other hand into a large dead-end pocket or cul-de-sac 16 formed by continuing deeply into the casting the inside socket opening into which the connection of a high-pressure gauge 17 is screwed. The upper part of the socket 15 is screw-threaded, and a nozzle 18 is screwed into it, this nozzle projecting upward into the low-pressure cavity 6 within the enclosure of the bounding wall 8. The passage through this nozzle is short and narrow and is approximately at right angles to the general direction in which gas or pressure may proceed from the approach passage directly into the large dead-end chamber 15, which is of very large capacity as compared with the capacity of the nozzle passage. The communicating port 19 from the approach passage into the dead-end pocket is beyond the entrance to the nozzle passage and is of large size.

These provisions effectually safeguard the seat 20 from ignition in event of the full pressure of the supply cylinder being applied suddenly. In that event dangerously high temperature resulting from compression in the regulator is not carried to the seat but is trapped in the dead-end pocket. The disposition of the passage 12 relative to the filter chamber is also such as to promote turbulence and commingling of the hotter and colder portions of the gas.

At the bottom of the cavity 6 there may be an opening 21 closed by a bursting disc 22, held in place by a screw plug 23 having openings. A low pressure gauge 24 and a low pressure outlet connection 25 communicate with the chamber 6. The bottom of the filter chamber is closed by a screw plug 60, which affords ready access to the filter.

The spring case 5 contains an adjusting spring 26 which reacts between a button 27 and a diaphragm plate 28, the latter unfastened to the diaphragm 7, which it backs. The button 27 is rotatably secured by a screw 29 to the inner end of an adjusting screw 30 which is in threaded engagement with the outer or upper end of the spring case.

Another helical spring 31 is disposed within the spring case, outside of the adjusting spring 26. Whereas the tension or compression on the latter spring may be relieved altogether by screwing the adjusting screw out all the way, the spring 31 is always under compression when the regulator is assembled. It is confined under pressure between a fixed shoulder 32 in the spring case and the plate 28, and is centralized by a portion 33 of the inside of the wall of the spring case which is substantially fitted by the upper convolution or convolutions of the spring. The lowermost convolution of this spring encircles a circular rib 34 struck up from the back of the diaphragm plate. In this way the diaphragm plate is kept in a central position.

The margin 35 is bent upward at an inclination and is accommodated within an annular recess 36 in the lower portion of the spring case, which recess is large enough so that the edge of the plate is free of all friction against the case in the operation of the regulator. In assembling the regulator, if the diaphragm plate is out of center, it is initially centralized by the crowding action of an outwardly and downwardly beveled surface 37 formed in the spring case at the lower edge of the recess.

The working parts below the diaphragm comprise simply a short lever 38, the seat 20 carried thereby, and a spring 39 cooperating with the lever. This lever lies wholly within the body cavity 6, inside the circular lines of the body. One end is disposed over and immediately adjacent the nozzle 18, and this end is formed with a downwardly facing recess 40 wherein the seat is partly or entirely received. The bottom, that is to say, in the position shown, the top wall of this recess, is formed with a low, central, substantially spherically rounded projection 41, against which the back of the seat bears. The recess being somewhat larger than the seat, this projection affords a universal support for the seat enabling the seat to tilt slightly in any direction relatively to the lever, thereby insuring that the seat will bear truly on the nozzle rim under all conditions.

The sides of the recess afford lateral guiding and retention for the seat, but in order better to secure the desired equalizing effect, without requiring too great accuracy in manufacture, a resilient or yielding device is disposed about the sides of the seat, between the same and the lever. Such a device may be made of various forms and materials. A pronged ring of more or less resilient sheet metal, of which two forms are shown, marked 42 and 42ª, respectively, is especially advantageous. The conformer ring 42 consists of a disc having a central opening 43 and a crown of fingers or prongs 44, which are curved inward, and then outward at their extremities. This ring is inserted into the recess 40, where it may be secured by soldering or simply be held frictionally, and the seat is inserted into the frictional and yielding embrace of the fingers.

The form 42ª has a peripheral flange 45 which is soldered to the under side of the lever around the mouth of the recess 40, and a ring of prongs 46 which are bent inwardly of the recess, inclining toward the center and away from the side wall of the recess, so as to form an elastic collar which clasps or very closely approaches the sides of the seat and permits of the desired self-adjusting or equalizing movability.

The conformer also keeps the seat from dropping out of the recess when the regulator is being assembled. In the operation of the regulator, however, it is not essential that the seat be actually clasped. Support is relative, and the necessary elements of support in this case are support for the back of the seat, at the face away from the nozzle, and sufficiently close lateral confinement. Therefore, when the seat is spoken of as carried by the lever, it is not necessarily to be understood that the seat might not drop out if the lever were removed from the nozzle. In operation, the seat is always carried by the lever in the sense of moving therewith and being supported and retained thereby for the performance of its function, also in the sense that it is not removed from the lever, with a separate equalizing connection between the seat and the lever as in certain regulators, or with a separate guide, the equalizing and guiding means here being in the single integral lever itself. It is naturally desirable, however, that the seat be more or less held or clasped at the sides, if for no other reason than that lateral movement of the seat on the nozzle is not sought.

It may be observed that terms of orientation are relative, since the regulator, though usually disposed in the manner shown in the drawings, may be placed in any position. The under side of the lever is the side toward the nozzle or away from the diaphragm, and the back or upper side of the lever is the side away from the nozzle or toward the diaphragm. Other terms indicating direction may be similarly transposed.

The rear end of the lever has an arched crest 47 which bears against the under side of the diaphragm, at its center. The contact of this crest, rather than of a broad surface of the lever, with the diaphragm is of advantage in that the performance of the regulator is not adversely affected for different positions of the lever.

Intermediate its ends the lever is formed or provided on its under side with a pair of fulcrum protuberances 48, these protuberances being widely spaced apart in the transverse direction and being equidistant from the longitudinal axis of the lever through the center of the seat. These protuberances can be economically formed in one piece with the lever. They are quite broad or thick, and their ends are spherically rounded. These rounded ends rest in shallow conical recesses 49, which are formed in the body 2 at the bottom of the cavity 6, adjacent the nozzle 18.

Such fulcrums are beneficial both from the standpoint of simplicity and from the standpoint of effectually alining the lever and seat. Their frictional engagement with the recesses in the operation of the lever is also such as to create a definite damping function, which prevents "singing" vibration from being set up, yet allows the lever to be delicately and evenly responsive to changes in outflow.

The fulcrum protuberances are closer to the center of the seat than they are to the crest 47 which bears against the diaphragm, the seat-carrying arm of the lever, therefore, being materially shorter than the arm which touches the diaphragm. For economy of manufacture it is best to form the protuberances on the lever and the coacting recesses in the body or fixed part of the regulator, but I do not exclude the reversal. In some cases, also, the pair of protuberances might be replaced by a single transversely-extending cylindrically curved projection, but I consider that to be less advantageous.

The spring 39 consists of a generally flat and broad plate, which may be normally, that is to say when out of place, perfectly flat, or may have an initial curved set, which would be less, however, than the bow or deflection which is imposed on the spring when fixed in the regulator and engaged with the lever. The spring plate is preferably approximately circular in outside contour, approximately filling the area of the cavity 6. A considerable part of its area is cut out, the opening 50 thus formed being eccentric and having a broad and wide basal portion remote from the nozzle and seat. This portion is clamped by a screw 52 to an inclined and somewhat raised surface 51 formed on the floor of the cavity 6.

The opening 50 accommodates the lever 38, which lies largely within the general area occupied by the spring, or the vertical projection of such area, and enables the forward or free portion of the spring to be flexed upward and engaged over the seat-carrying end of the lever. The portions of the spring at opposite sides of the opening preferably form limbs, terminating in two ends or tips 53 which engage with the lever, and it will be observed that the spring increases in width from these narrow ends rearwardly through the limbs to the broad, fixed base. The spring illustrated may be described as approximately crescent-shaped, though I do not limit myself to the precise form. In general, the construction of the spring is such that the stresses are quite evenly distributed throughout the length. The result is a very flexible spring for a given size of regulator body, contributing very materially to the responsiveness and satisfactory functioning of the regulator. It is also a very compact spring.

The lever 38 is formed with lateral ears 54 providing upwardly facing surfaces for the spring tips 53 to bear against. These ears or surfaces are disposed substantially in transverse alinement with the seat 20, and equidistant therefrom. The surfaces are also preferably located very low on the lever, being depressed materially below the back of the seat-carrying portion thereof, and preferably into proximity to the plane of the lower or outer face of the seat. This is so that, for any slight rocking of the lever, there shall be virtually no rubbing between these surfaces and the spring tips.

Figure 12:
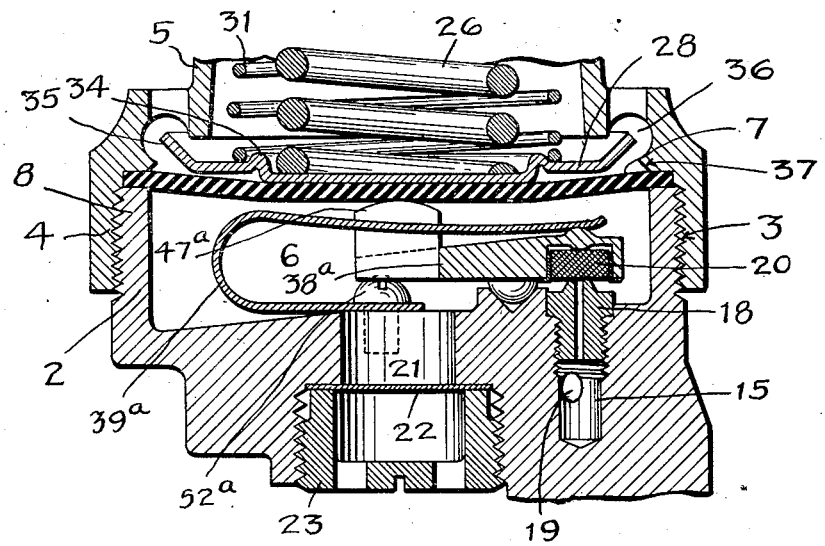
Fig. 12 is a central longitudinal section of a portion of a regulator embodying the invention having different forms of lever and compensating spring, the section being somewhat distorted so as to show one of the fulcrum recesses.
Figure 13:
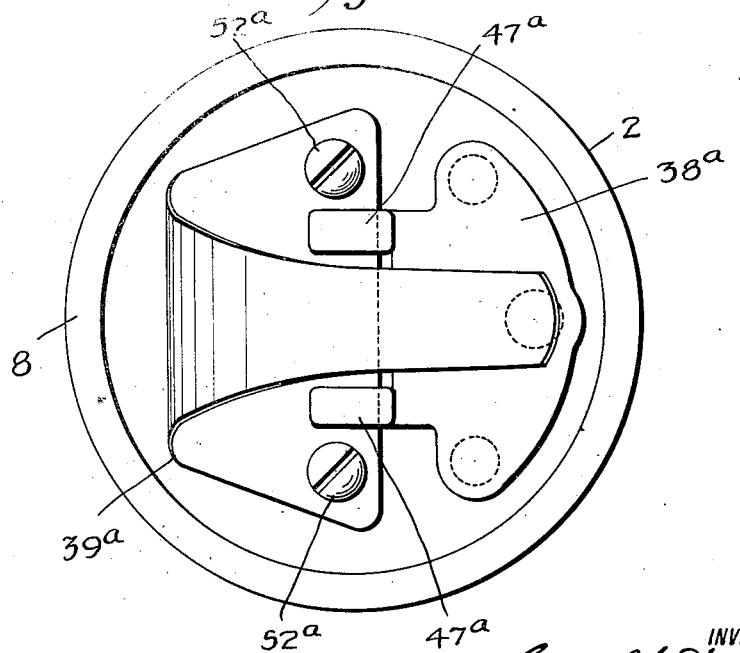
Fig. 13 is a plan view of Fig. 12, with the spring case and diaphragm removed.

Figs. 12 and 13 illustrate a different form of plate spring and a somewhat different form of lever. The spring is marked 39$^a$ and the lever 38$^a$. Like the spring 39, the spring 39$^a$ increases in width from its free extremity or tip to its broad fixed part, which in this instance is shown secured to the bottom of the cavity 6 by two screws 52$^a$. The attachment of this spring is more toward the diameter of the body transverse to the length of the lever, meaning by length, in this instance, the dimension of the lever at right angles to the axis on which it rocks. From the region of attachment to the body the broad part of the spring extends away from the nozzle 18 toward the remote portion of the wall 8, and is then upwardly recurved, continually diminishing in width, and extends forward over the lever, its free end bearing upon a low rounded knob on the lever directly over the seat 20, or adjacent this region. The lever in this case, also, lies partly within the spring, and its rear portion is bifurcated and provided with two rounded crests 47ª, at opposite sides of the limb of the spring, to coact with the diaphragm.

The advantages of this spring are similar to the one previously described, the other form, however, being preferred.

A function of the spring 39 or 39ª is to balance the pressure of the gas within the nozzle. It is designed, however, as explained in the introductory part of the specification, to have a degree of stress very considerably beyond what is required for that purpose. This excess of stress is not ordinarily applied to the seat and nozzle, because it is balanced by the spring 31 to which reference has heretofore been made. In other words, the spring 31 ordinarily balances or neutralizes a considerable part of the stress in the spring 39 or 39ª. If, however, the seat should fail to coact properly with the nozzle, so that pressure would build up in the cavity 6, the diaphragm would be forced thereby against the action of the spring 31, or the combined action of the springs 31 and 26, thus leaving the spring 39 or 39ª free to exert greater pressure on the seat 20 against the nozzle, and eventually its full, heavy pressure, thereby in most instances forcing the seat to a tight closure and killing the creep. The form of the additional spring means represented by the spring 31 can be considerably varied.

Other forms and modifications of the invention will suggest themselves.

I claim:

1. A pressure regulator having, a diaphragm with a spring to act thereon, a fixed part provided with a high-pressure nozzle, a seat to coact with said nozzle, a compensating spring, and a lever formed at one end to press said seat against said nozzle and at its remote portion bearing unfastened against the diaphragm, said lever having lateral portions symmetrical with respect to the seat region adapted to receive the pressure of the ends of the compensating spring.

2. A pressure regulator having, a diaphragm with a spring to act thereon, a fixed part provided with a high-pressure nozzle, a seat to coact with said nozzle, a compensating spring, and a lever formed at one end to press said seat against said nozzle and at its remote portion bearing unfastened against the diaphragm, said lever having lateral portions symmetrical with respect to the seat region adapted to receive the pressure of the ends of the compensating spring, said portions comprising upwardly facing surfaces depressed materially below the adjacent part of the back of the lever.

3. A pressure regulator having, a diaphragm with a spring to act thereon, a fixed part provided with a high-pressure nozzle, a seat to coact with said nozzle, a lever operatively related to said diaphragm and adapted to press said seat against said nozzle, and a plate spring symmetrical with respect to said lever and having a broad portion secured to said fixed part and a narrow limb portion bearing on said lever.

4. A pressure regulator having, a diaphragm with a spring to act thereon, a fixed part provided with a high-pressure nozzle, a seat to coact with said nozzle, a lever operatively related to said diaphragm and adapted to press said seat against said nozzle, and a plate spring symmetrical with respect to said lever and having a broad portion secured to said fixed part and a narrow limb portion bearing on said lever, said spring being so formed as to accommodate the lever partly within it.

5. A pressure regulator having, a diaphragm with a spring to act thereon, a fixed part provided with a high-pressure nozzle, a seat to coact with said nozzle, a lever operatively related to said diaphragm and adapted to press said seat against said nozzle, and a plate spring having a broad rear portion secured to said fixed part and its interior cut out in advance of said rear portion and a narrow forward portion bearing on said lever.

6. A pressure regulator having, a diaphragm with a spring to act thereon, a fixed part provided with a high-pressure nozzle, a seat to coact with said nozzle, a lever operatively related to said diaphragm and adapted to press said seat against said nozzle, and a plate spring having a broad rear portion secured to said fixed part and its interior cut out in advance of said rear portion forming two limbs bearing at their extremities on said lever.

7. A pressure regulator having, a diaphragm with a spring to act thereon, a fixed part provided with a high-pressure nozzle, a seat to coact with said nozzle, a lever operatively related to said diaphragm and adapted to press said seat against said nozzle, and a substantially crescent-shaped plate spring secured at its basal portion to said fixed part and bearing at its terminals on said lever.

8. A pressure regulator having, a diaphragm with a spring to act thereon, a fixed part provided with a high-pressure nozzle, a seat to coact with said nozzle, a lever operatively related to said diaphragm and adapted to press said seat against said nozzle, and an approximately circular plate spring having its interior eccentrically cut out, said spring secured at its broad portion to said fixed part and at its narrow portion bearing on said lever.

9. In a gas pressure regulator of the class wherein a seat closes against a nozzle, a body provided with said nozzle, said body formed with a high pressure passage traversed by the gas on its way to the nozzle, a high-pressure gauge connection, and a large dead-end pocket at the region of said connection in unrestricted communication with the nozzle end of said passage.

10. In a gas pressure regulator, the combination of a fixed part provided with a high-pressure orifice, a diaphragm, an adjusting spring to act on said diaphragm, means coacting with said orifice and adapted to close against the gas issuing therefrom, said means having an operative connection with the diaphragm which is unfastened to the diaphragm, a compensating spring coacting with said means and having an excess of stress, and additional spring means constantly bearing on the diaphragm, unaffected by adjustment of the adjusting spring, to balance off excess stress in said compensating spring.

11. In a pressure regulator, a body, a spring casing, a diaphragm clamped between said body and spring casing, a diaphragm plate backing said diaphragm and unfastened thereto, said diaphragm plate having an upwardly inclined margin and a circular formation inwardly of said margin, a spring coacting with said formation to maintain the diaphragm plate in central operation, said spring case having an internal annular recess adjacent its diaphragm clamping portion, in which recess said margin is free of contact with the spring case in the operation of the regulator, the spring case having an inclined surface for initially centering the diaphragm plate.

12. A pressure regulator having, in combination, a low-pressure cavity, a diaphragm closing one side of said cavity, an adjusting spring to act on said diaphragm, a high-pressure nozzle, a single lever disposed within said cavity and having a long arm coacting with said diaphragm, a seat on the short arm of said lever, a compensating spring acting on said lever to close said seat against said nozzle, said seat being directly carried and solely guided on the short arm of said lever, and equalizing means for the seat in said short arm of the lever.

13. A pressure regulator having, in combination, a body with a high-pressure orifice, a diaphragm with an adjusting spring to bear thereon, a seat to coact with said orifice, a lever acting between said diaphragm and said seat, a compensating spring acting on said lever to close said seat against said orifice, and dampening means between said lever and said body comprising broad rounded fulcrum protuberances on the one bearing in concave recesses in the other 14. A lever-type pressure regulator comprising a body having a high-pressure orifice, a seat coacting with said orifice, and a lever acting on said seat, said lever having broad rounded fulcrum protuberances and said body having concave recesses to receive the same, said protuberances being adapted to work in said recesses with sufficient friction to prevent "singing" vibration from being set up.

15. A pressure regulator comprising the combination of a body containing a low-pressure cavity, a diaphragm closing one side of said cavity, a spring to act on said diaphragm, a high-pressure nozzle projecting upward from the floor of said cavity, a seat coacting with said nozzle, an operating connection comprising a single lever disposed within said cavity and having a long arm coacting with the diaphragm and a short arm carrying said seat at its under side, freely separable coacting fulcrum elements on the under side of said lever and on the body, the fulcrum being intermediate the end of the long arm and the seat, and a compensating spring acting upon said lever adjacent said seat to hold the seat against the nozzle, said lever being held in place by said compensating spring.

GEORGE M. DEMING.